United States Patent
Yu et al.

(10) Patent No.: US 10,713,123 B2
(45) Date of Patent: Jul. 14, 2020

(54) METHOD, DEVICE AND COMPUTER PROGRAM PRODUCT FOR DATA BACKUP

(71) Applicant: EMC IP Holding Company LLC, Hopkinton, MA (US)

(72) Inventors: Jing Yu, Shanghai (CN); Ming Zhang, Shanghai (CN); Li Ke, Chengdu (CN); Na Li, Chengdu (CN); Tao He, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/251,449

(22) Filed: Jan. 18, 2019

(65) Prior Publication Data

US 2019/0220364 A1 Jul. 18, 2019

(30) Foreign Application Priority Data

Jan. 18, 2018 (CN) .......................... 2018 1 0049719

(51) Int. Cl.
*G06F 11/14* (2006.01)
(52) U.S. Cl.
CPC ...... *G06F 11/1451* (2013.01); *G06F 11/1464* (2013.01); *G06F 2201/815* (2013.01)

(58) Field of Classification Search
CPC .......... G06F 11/1451; G06F 2201/815; G06F 11/1464
USPC ........................................................ 711/162
See application file for complete search history.

(56) References Cited

U.S. PATENT DOCUMENTS

| 9,292,520 | B1 | 3/2016 | Madiraju Varadaraju |
| 9,645,892 | B1 | 5/2017 | Patwardhan |
| 9,740,577 | B1 | 8/2017 | Chakraborty et al. |
| 2014/0365740 | A1* | 12/2014 | Vasilyev ............. G06F 11/1451 711/162 |

* cited by examiner

*Primary Examiner* — Hua J Song
(74) *Attorney, Agent, or Firm* — Chamberlain, Hrdlicka, White, Williams & Aughtry (57) ABSTRACT

The present disclosure relates to a data backup method and device, and a method, device and computer program product for managing data backup. The method for data backup implemented at the computing device comprises: receiving a backup message indicating that data backup is to be performed, the backup message indicating at least one of the following: a virtual machine to be backed up, an operating computing device of the virtual machine to be backed up, and a virtual disk to be backed up; determining, based on the backup message, a block device for which data backup is to be performed, the block device corresponding to at least a part of the virtual disk to be backed up; and performing incremental backup on data in the block device.

10 Claims, 6 Drawing Sheets

METHOD, DEVICE AND COMPUTER PROGRAM PRODUCT FOR DATA BACKUP

FIELD

The present disclosure relates to a method for data backup and a system thereof. More specifically, the present disclosure relates to a method, device and computer program product for data backup implemented at a computing device, and a method, device and computer program product for managing data backup.

BACKGROUND

With the development of technologies associated with cloud computing, more and more enterprises or users migrate the infrastructure required by computing from a local data center to a public cloud, a private cloud or a hybrid cloud so as to achieve the purpose of lowering costs and reducing energy and space consumption. In a cloud environment where services are provided to utilize all the computing infrastructure, namely, Infrastructure as a Service (IaaS), it is necessary to perform quick backup/restoration of the virtual machine in many cases.

The traditional data backup mode includes, for instance, full backup, differential backup and incremental backup, where the incremental backup mode has the advantages of low energy consumption and high backup speed as it does not need to occupy CPU or memory resources to process unchanged data. However, in an IaaS cloud environment, since there does not exist a corresponding application program interface (CBT-API) for change block tracking, for instance, generally, full backup is only performed for the virtual disk of the virtual machine under the cloud environment, while it is impossible to perform incremental backup for the virtual machine operating on the computing node of the cloud environment, which is obviously adverse to the improvement of backup efficiency and performance.

SUMMARY

The present disclosure provides a method for data backup that enables incremental backup for a virtual machine operating in a cloud environment, thereby improving the efficiency and performance of data backup.

In accordance with a first aspect of the present disclosure, there is provided a method for data backup, comprising: receiving a backup message indicating that data backup is to be performed, the backup message indicating at least one of the following: a virtual machine to be backed up, an operating computing device of the virtual machine to be backed up, and a virtual disk to be backed up, determining, based on the backup message, a block device for which data backup is to be performed, the block device corresponding to at least a part of the virtual disk to be backed up; and performing incremental backup on data in the block device.

In accordance with a second aspect of the present disclosure, there is further provided a device for data backup, comprising: a memory configured to store one or more programs; and a processing unit coupled to the memory and configured to execute the one or more programs to cause the device to perform the method according to the first aspect.

In accordance with a third aspect of the present disclosure, there is provided a method for managing data backup, comprising: transmitting a backup message indicting that data backup is to be performed, the backup message indicating at least one of the following: a virtual machine to be backed up, an operating computing device of the virtual machine to be backed up, and a virtual disk to be backed up, so that the operating computing device performs, based on the backup message, incremental backup to a block device for which data backup is to be performed.

In accordance with a fourth aspect of the present disclosure, there is provided a device for managing data backup, comprising: a memory configured to store one or more programs; and a processing unit coupled to the memory and configured to execute the one or more programs to cause the device to perform the method according to the third aspect.

In accordance with a fifth aspect of the present disclosure, there is provided a computer program product being tangibly stored on a non-transient computer readable medium and including computer executable instructions, the computer executable instructions, when executed, cause a computer to perform the method of the first aspect.

In accordance with a sixth aspect of the present disclosure, there is provided a computer program product being tangibly stored on a non-transient computer readable medium and including computer executable instructions, the computer executable instructions, when executed, cause a computer to perform the method of the third aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description of the example embodiments of the present disclosure with reference to the accompanying drawings, the above and other objectives, features, and advantages of the present disclosure will become more apparent. In example embodiments of the present disclosure, the same reference signs usually represent the same components.

Throughout the drawings, the same or corresponding reference symbols refer to the same or corresponding parts.

DETAILED DESCRIPTION OF EMBODIMENTS

Preferred embodiments of the present disclosure will be described in the following in greater detail with reference to the drawings. Although preferred embodiments of the present disclosure are displayed in the drawings, it is to be understood that the present disclosure may be implemented in various manners, not limited to the embodiments illustrated herein. On the contrary, these embodiments are provided to make the present disclosure more thorough and complete and convey the scope of the present disclosure completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment," Terms "first," "second" and others can denote different or identical objects. The following text may also contain other explicit or implicit definitions.

As described above, the traditional data backup method for a virtual machine is mainly full backup for a virtual disk of a virtual machine in a cloud environment. This backup method is not good for saving network bandwidth and target storage resources. Although it is possible to further use deduplication function so that unchanged data are not migrated to the target storage device to achieve the purpose of saving network bandwidth and target storage resources, these unchanged data still need to consume some CPU and memory resources to be processed, for instance, performing hash computation. Therefore, the traditional data backup method for the virtual machine has a disadvantage of hindering the improvement of backup efficiency.

To at least partly solve one or more of the above and other potential problems, example embodiments of the present disclosure provide a scheme for data backup of a virtual machine in which a backup message indicating that data backup is to be performed is obtained at a computing device, the backup message indicating the virtual machine to be backed up, the operating computing device of the virtual machine to be backed up and the virtual disk to be backed up, the operating computing device of the virtual machine to be backed up determines, based on this backup message, the block device corresponding to the virtual disk and performs incremental backup on data in the block device.

By means of the above incremental backup scheme, only block data changing after a previous backup are backed up without consuming additional CPU and memory resources to process unchanged data. Therefore, it is possible to reduce the time required by the backup processing substantially and CPU, memory, disk TO and other system resources consumed by each backup, thereby improving efficiency and performance of data backup. Besides, as the above incremental backup performs tracking and backup based on changed data of the block device and it is not necessary to perform reconfiguration based on the management program or configuration information of the storage backend, it supports different management programs and storage backends.

Embodiments of the present disclosure will be described in detail below with reference to the drawings.

Figure 1:
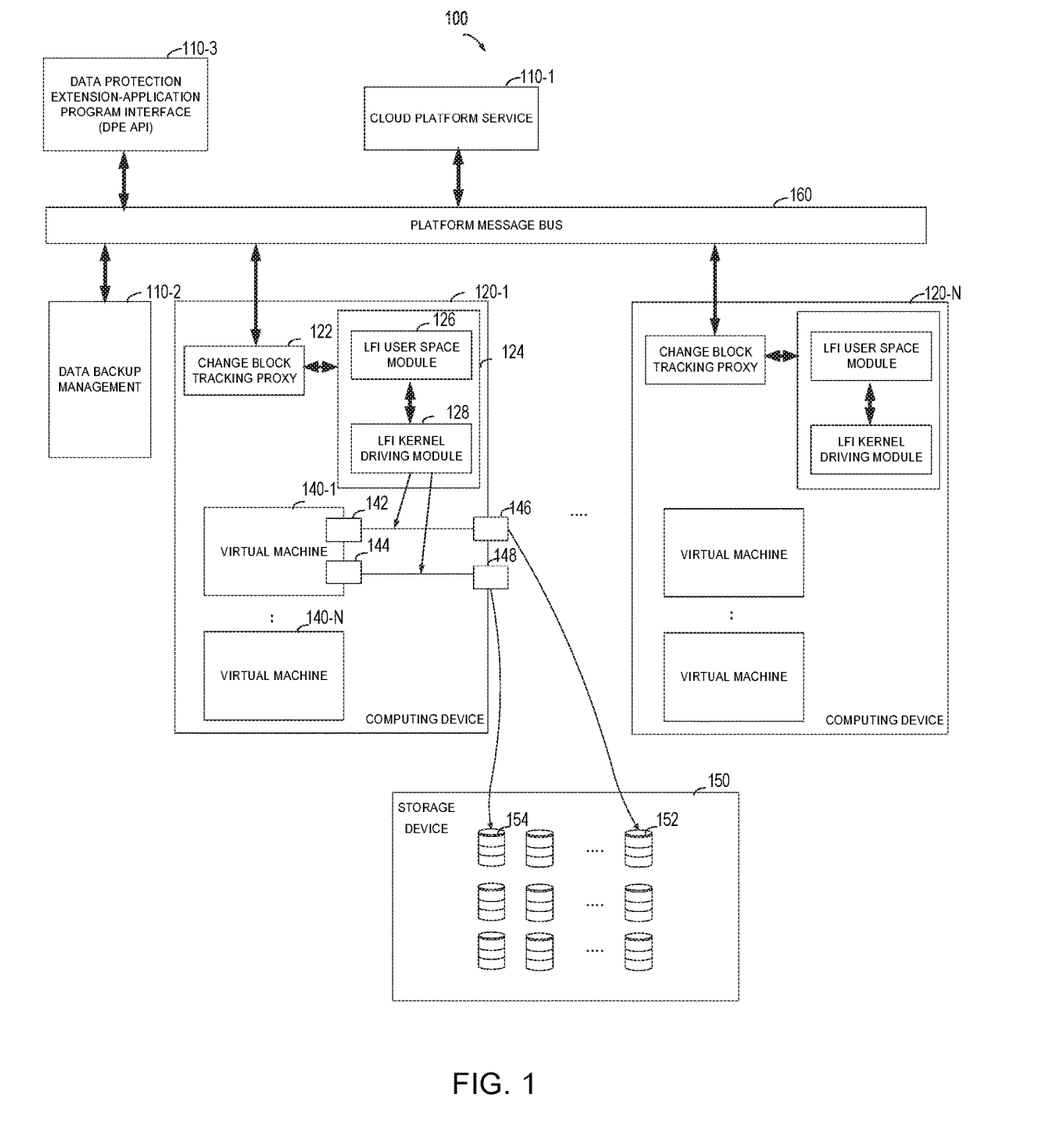
FIG. 1 is a schematic diagram illustrating an example computer network system 100 implementing one or more embodiments for data backup of a virtual machine.

FIG. 1 is a schematic diagram illustrating an example computer network system 100 for implementing one or more embodiments for data backup of a virtual machine. The example computer network system 100 includes one or more controlling nodes and one or more computing nodes, where the controlling nodes are coupled to the computing nodes directly or indirectly through network. The controlling nodes are used for control of the rest of the nodes, for instance, including creation of a virtual machine, migration, network distribution, storage distribution, backup management and so on. The above application may be deployed on a single control device or virtual machine or on a plurality of different control devices or virtual machines. The computing nodes may be used to run a plurality of computing devices 120-1, 120-N and so on (hereinafter collectively referred to as computing device 120) of the user application. Each computing device 120 may have one or more processing units, including dedicated processing units such as GPU, FPGA and ASIC and universal processing units such as CPU. Besides, one or more virtual machines 140-1, 140-N (hereinafter collectively referred to as computing device 140) operate on each computing device 120. Each virtual machine 140 may include one or more virtual disks, such as virtual disks 142 and 144. The network may be cloud network, LAN, WAN or other appropriate networks. In some embodiments, the computer network system 100 is, for instance, but is not limited to, an OpenStack-based architecture.

Regarding the controlling nodes, in some embodiments, the controlling nodes include a module 110-1, a module 110-2, a module 110-3 and a platform message bus 160, where the platform message bus is used for interaction or a communication mechanism of devices or components in the cloud platform system, and may be, but not limited to, the following implementations: message array, HTTP-based request-response, remote procedure call (RPC), database, key-value store and so on, where modules 110-1, 110-2 and 110-3 may be program modules. It is to be understood that the above modules 110-1, 110-2 and 110-3 may be deployed in the same controlling node or on a plurality of different controlling nodes. In some embodiments, modules 110-1 and 110-2 are deployed on the same controlling node.

Specifically, the module 110-1 is used for cloud platform services and provides an application program interface for creating or deleting virtual machines, and creating or deleting virtual disks. The above operation data for the virtual machine are transmitted to other devices in the network platform via the message bus for other devices in the network to learn the above operations of the virtual machine by monitoring the platform message bus 160. The module 110-2 is used for data backup management and it transmits a backup message indicating that data backup is to be performed so that the computing device makes backup preparation and performs backup for the virtual machine to be backed up and its virtual disks. The module 110-3, for instance, is deployed with a data protection extension-application program interface (DPE API) which provides an application program interface for the user interface or a third party application, and it may be also responsible for platform integrated authentication and authorization, for instance, during the registration or update of the virtual machine, the user may enable the registered virtual machine by setting an optional parameter "change block tracking Enable (cbtEnable)" so as to allow all or a part of the virtual disks mounted by the virtual machine to perform "change block tracking" function. When the "cbtEnable" parameter of all or a part of the virtual disks mounted by the virtual machine is set as true (namely, "change block tracking" is enabled), it means: the "change block tracking" function will be started to track data changes of the enabled virtual disk.

Regarding the computing nodes, in some embodiments, each computing device 120-1 for implementing the computing node includes, but is not limited to, for instance, a change block tracking proxy module 122, one or more user virtual machines (for instance, 140-1 and 140-N and so on) and a fast incremental module 124, where the change block tracking proxy module 122 is used to monitor messages on the platform message bus so as to acquire a backup message indicating that data backup is to be performed for the virtual machine (such as virtual machine 140-1) operating on the host computing device, and determine the block device corresponding to the virtual disk of the virtual machine 140 to be backed up. The fast incremental module 124 is used to start the session corresponding to the block device in response to the storage corresponding to the virtual disk being enabled the "change block tracking" function, and configure the bitmap of the session (for instance, change the bit in the bitmap) based on the data written into the block device. When the incremental backup is triggered, a change block list is generated based on the bitmap. For instance, a change block list is generated based on the bitmaps of the ongoing backup and the previous backup; and current backup identifier number of the session is updated. In some embodiments, it further includes: a switching session so as to continue to track the changed data of the block device. In some embodiments, changed data of the block device are tracked with a fast incremental module 124, for instance, EMC Linux fast incremental (LFI) module. The fast incremental module 124, for instance, includes an LFI user space module 126 and an LFI kernel driving module 128, where the LFI user space module 126 is used to manage and maintain the session, and the LFI kernel driving module 128 is used to intercept writes on Internet Small Computer System Interface (iSCSI) or fiber channel, and configure, based on the intercepted writes, the bitmap of the session correspondingly.

Figure 2:
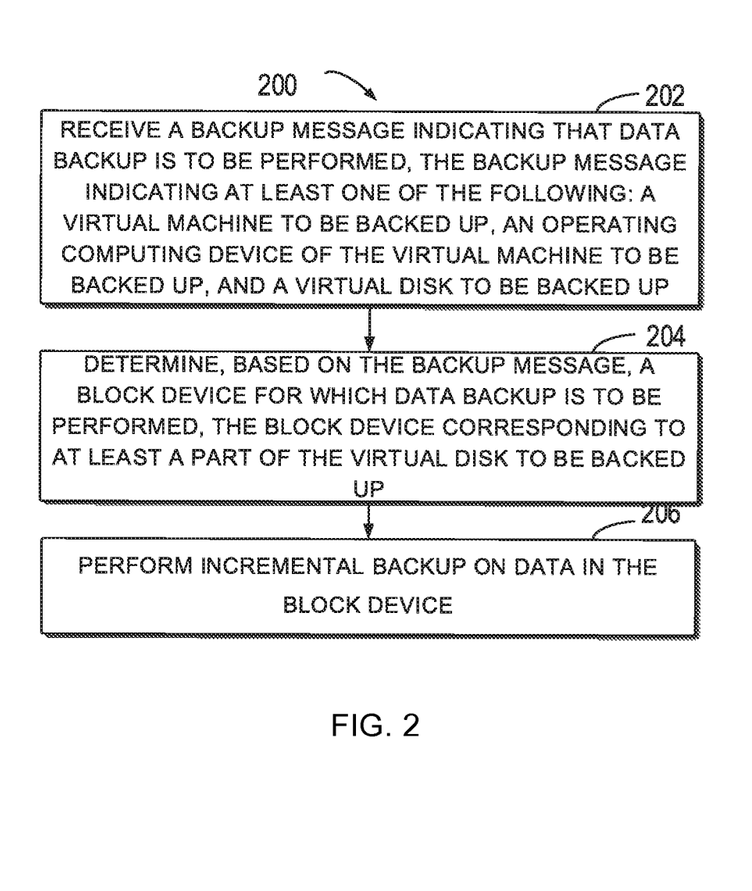
FIG. 2 is flowchart illustrating a data backup method 200 implemented at a computing device in accordance with embodiments of the present disclosure.

FIG. 2 is a flowchart illustrating a data backup method 200 implemented at a computing device in accordance with embodiments of the present disclosure. In FIG. 2, each act is implemented by the computing device 120-1 in the computer network system 100 shown in FIG. 1. For the ease of discussion, without losing generality, the method 200 will be described with the computing device 120-1 in the computer network system 100 shown in FIG. 1 as an example. It is to be understood that method 200 may further include additional acts not shown and/or omit the shown acts and the scope of present disclosure is not limited in this aspect.

At 202, the computing device 120-1 receives a backup message indicating that data backup is to be performed, the backup message indicating at least one of the virtual machine to be backed up, the operating computing device of the virtual machine to be hacked up, and the virtual disk to be backed up. In some embodiments, the change block tracking proxy module 122 of the computing device 120 is used to monitor the platform message bus so as to acquire the backup message for data backup management and transmitted by 110-2. In some embodiments, the backup message indicates the ID of the virtual machine 140-1 to be backed up, the ID of the operating computing device 120-1 of the virtual machine to be backed up and the IDs of the virtual disks 142 and 144 to be backed up to be learned by the operating computing device 120-1 of the virtual machine 140-1: backup preparation is to be made for which virtual disks of the virtual machine 140-1. In some embodiments, the backup message indicates the ID of the virtual machine 140-1 to be backed up and the ID of the operating computing device 120-1 of the virtual machine to be backed up for the operating computing device 120-1 of the virtual machine 140-1 to make backup preparation for multiple virtual disks mounted by the virtual machine. In some embodiments, the backup message indicates the ID of the virtual machine 140-1 to be backed up so that all the computing devices in the network search whether the virtual machine 140-1 to be backed up operates on the host. If yes, then backup preparation is made for all the virtual disks of the virtual machine 140-1.

At 204, block devices 146 and 148 on 120-1 that correspond to volumes 152 and 154 on the storage device 150 corresponding to virtual disks 142 and 144 are determined based on the backup message. The block devices (such as 146 and 148) correspond to at least a part (such as 142 and 144) of the virtual disk to be backed up. In some embodiments, when the computing device 120-1 determines that the operating computing device ID of the virtual machine to be backed up in the backup message corresponds to the computing device 120-1, then the operation data of the virtual machine 140 to be backed up are acquired; and then, at least a part of the virtual disk of the virtual disk 140-1 is determined on the basis of the operation data, such as the block devices 146 and 148 corresponding to virtual disks 142 and 144. The block devices 146 and 148 may be local block devices of the computing device 120-1 or block devices on the remote storage device 150.

In some embodiments, the change block tracking proxy module 122 of the computing device 120-1 looks for the operation data of the virtual machine 140-1 to be backed up on the computing device 120-1 by running the runtime library, such as libvirt in OpenStack. The operation data include mapping information of virtual disks 142 and 144 of the virtual machine 140-1 mounted on the block device of the computing device. For example, Table 1 below illustratively shows: response output implemented based on OpenStack nova and obtained when operation data of the virtual machine to be backed up on the computing device are looked up, where a part of operation data are shown. It is to be understood that the response output is only example and the scope of the present disclosure is not limited in this regard.

TABLE 1

```
<domain type='kvm'>
    <name>instance-00000028</name>
    <uuid>cb4f8471-1900-42c9-ac10-e3a2120a27bf</uuid>
    ..
    <devices>
    ...
        <disk type='block' device=disk'>
            <driver name='qemu' type='raw' cache='none io='native'/>
            <source
dev=/dev/disk/by-path/ip-10.62.235.221:3260-iscsi-icn.2010-10.org.openstack:volume-e7b
8f5da-ba29-4cab-b06b-8b52d7f6c164-lun-0'/>
            <target dev='vdb' bus='virtio'/>
            <serial>e7b8f5da ba29 4cab b06b 8b5 2d7f6c164</serial>
            <address type='pc' domain='0x00C0' bus='0x00' slot='0x06' function='0x0'/>
        </disk>
```

TABLE 1-continued

```
<disk type='block' device=disk'>
    <driver name='qemu' type='raw' cache='none io='native'/>
    <source dev=>
    <target dev='vdc' bus='virtio'/>
    <serial>bb44457b-3cf8-4e4b-a7ee-45114b7de891</serial>
    <address type='pc' domain='0x00C0' bus='0x00' slot='0x07' function='0x0'/>
</disk>
    ...
</devices>
</domain>
```

For example, it may be known from the example operation data indicated in the response output: the virtual disk to be backed up "e7b8f5da-ba29-4cab-b06b-8b52d7f6c164" with the virtual machine ID "instance-00000028" is mapped to the block device "'/dev/disk/by-path/ip-10.61235.221: 3260-iscsi-ign.2010-10.org.openstack:volume-bb4 4457b-3cf8-4e4b-a7ee-45114b7de891-lun-0'/" mounted on with the computing device (namely, host) ID "compute1.lab.emc.com." The block device may be a local block device of the computing device 120-1 or a remote block device mounted on the computing device 120-1.

At 206, incremental backup is performed for data in the block device. In some embodiments, when "change block tracking" function is initiated for block devices 146 and 148 corresponding to the virtual disks 142 and 144 to be backed up, or in other words, when the corresponding block device is determined for the virtual disk enabled with "change block tracking," the session corresponding to the block device is initiated to track data changes of the block device; then, a bitmap of the session is configured based on data written into the block device; when the incremental backup for the virtual disk is triggered, a change block list corresponding to the block device is determined based on the bitmap to indicate data change in between this backup and the previous backup; and the identifier number of this backup of the session is updated based on the change block list, for example, adding the identifier number of this backup by 1 on the basis of the previous backup identifier number. In some embodiments, the change block list, for instance, includes offset and length data. The computing device 120-1 returns the change block list, for instance, in the manner of response message, to module 110-2 for data backup management.

Through the above solution, the operating computing device of the virtual machine to be backed up is made to acquire the virtual disk mounted by the virtual machine to be equipped in the manner of backup message, so as to transform incremental backup for the block device to incremental backup on the virtual disk to be backed up of the virtual machine based on the mapping relation between the virtual disk and block device mounted on the operating computing device. In this way, backup efficiency may be improved and backup speed may be quickened.

In some embodiments, during the backup process, incremental backup is not necessarily performed as long as "change block tracking" function is initiated for block devices 146 and 148. In some cases, incremental backup may not be performed. For example, in between two backups, the user stops change block tracking and resumes again. Under this condition, changed data of the block device recorded through bitmap cannot truly reflect all the changed data between this backup and the previous backup. To prevent data loss in the above similar situations and ensure integrity and reliability of backup data, it is further necessary to determine whether "incremental backup triggering condition" is met. Only when the incremental backup triggering condition is met, incremental backup for data in the block device is triggered.

Figure 3:
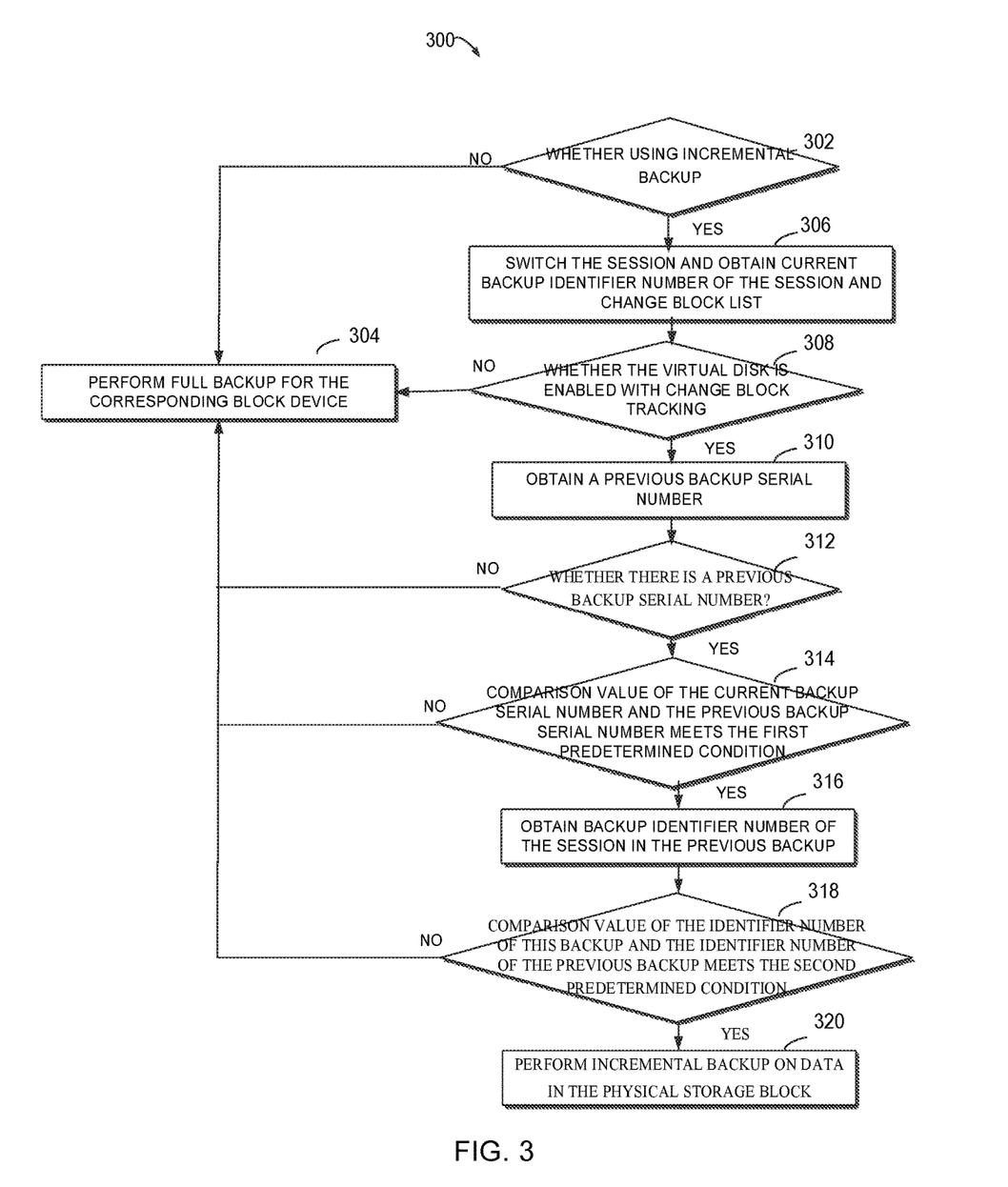
FIG. 3 is flowchart illustrating a method 300 for determining whether triggering condition of incremental backup is met in accordance with embodiments of the present disclosure.

FIG. 3 is a flowchart illustrating a method 300 for determining whether "incremental backup triggering condition" is met in accordance with embodiments of the present disclosure. The method 300 is implemented at the computing device (such as the computing device 120-1). As shown in FIG. 3, at 302, first of all, it is determined whether the user or upper layer application indicates performing backup in an incremental manner for this backup. If no, at 304, full backup is performed for the physical storage module corresponding to the virtual disk to be backed up. If yes, at 306, the session is switched and the backup identifier number of the session and change block list are obtained. The identifier number of this backup is obtained based on the identifier number of the previous backup, for instance, the identifier number of this backup=the identifier number of the previous backup+1. The identifier number of this backup is used to identify the session corresponding to the physical storage module uniquely.

At 308, it is determined whether the virtual disk is enabled change block tracking. This is mainly because at the registration of the virtual machine, the user may only choose to enable a part of the virtual disk with the "change block tracking" function and the virtual disk that is not enabled can only be backed up fully. If the determination result at 308 is "no," then return to 304 and perform full backup for the corresponding physical storage module. If yes, at 310, the serial number of the previous backup is obtained. At 312, it is determined whether the serial number of the previous backup exists, if no, full backup is performed. The backup serial number is used to identify backup for the virtual machine to be backed up. If the backup serial number does not exist, for example, indicating that this backup is first backup, it is impossible to perform incremental backup. If the determination result at 312 is "yes," at 314, it proceeds to determine whether the comparison value of the serial number of this backup and that of the previous backup meets the first predetermined condition, for instance, but not limited to, determine whether "the serial number of this backup=the serial number of the previous backup+1." if no, then return to 304, and perform full backup. If "the serial number of this backup=the serial number of the previous backup+1," it means that this backup and the previous backup are two consecutive backups. If yes, then proceed to 316.

At 316, the backup identifier number of the session in the previous backup is obtained. At 318, it is determined whether the comparison value of the identifier number of this backup and the identifier number of the previous backup meets the second predetermined condition, for instance, but not limited to, determining whether the backup identifier number of this session=the previous backup identifier number+1, which is used to determine whether the session is consecutive. It no, return to 304 and perform full backup, for instance, but not limited to, terminating change block tracking and resuming in between this backup and the previous backup. If yes, proceed to 320 at which incremental backup is performed for data in the block device.

By means of the above method 300, a triggering condition for incremental backup is configured. Only when the triggering condition of incremental backup is met, incremental backup is performed for data in the block device; when the triggering condition of incremental backup is not met, full backup is performed for data in the virtual disk or block device so that in some special cases not fit for incremental backup, for instance, when in this backup, the user does not choose to enable "change block tracking," this backup is first backup, and the user terminates and resumes again change block tracking in between this backup and the previous backup, full backup is performed to avoid the condition that the change block list generated under the above special cases cannot truly reflect data change with respect to the previous backup and results in data loss, thereby ensuring integrity and security of data backup.

Embodiments of the present disclosure further provide a scheme for managing data backup. In the data backup management scheme, a backup message indicating that data backup is to be performed is transmitted to indicate at least one of the virtual machine to be backed up, the operating computing device of the virtual machine to be backed up, and the virtual disk to be backed up in order that the operating computing device of the virtual disk performs incremental backup for the block device that requires data backup based on the backup message. With the above scheme, it is possible to control the computing device to perform incremental backup of the corresponding storage block based on the acquired information of the backup to be performed for the virtual machine operating thereon and its virtual disk so as to reduce the time and system resources consumed by the backup processing, hereby improving data backup efficiency and performance.

Figure 4:
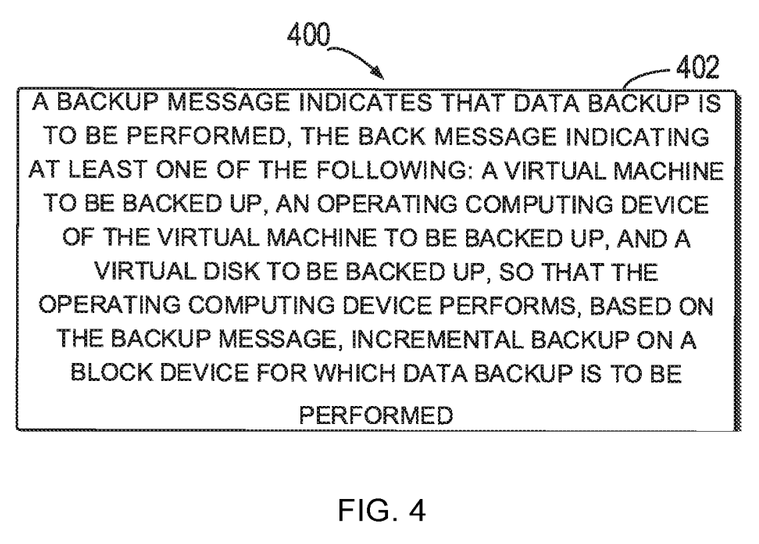
FIG. 4 is a flowchart illustrating a data backup management method 400 in accordance with embodiments of the present disclosure.

FIG. 4 is a flowchart of a data management method 400 in accordance with embodiments of the present disclosure. In FIG. 4, each act is performed by, for instance, the data backup management module 110-1 in the computer network system 100 shown in FIG. 1. For ease of discussion, without losing generality, the method 400 is depicted with the backup management module 110-1 in the computer network system 100 shown in FIG. 1 as an example. It is to be understood that method 400 may further include additional acts not shown and/or omit the shown acts, and the scope of the present disclosure is not limited in this aspect.

At 402, a backup message is transmitted, indicating at least one of the virtual machine to be backed up, the operating computing device of the virtual machine to be backed up, and the virtual disk to be backed up so that the operating computing device performs incremental backup for the block device for which data backup is to be performed based on the backup message. In some embodiments, to enable or disenable "change block tracking" or to generate a change block list, it is necessary to find the computing device that the virtual machine to be backed up is operating and the block device corresponding to the virtual disk mounted by the virtual machine to be backed up.

In some embodiments, method 400 further includes: in response to a periodic backup request or instant backup request, acquiring configuration data associated with at least one of the virtual machine to be backed up, the operating computing device of the virtual machine to be backed up, and the virtual disk to be backed up; and generating a backup message based on the configuration data. In some embodiments, it is possible to interact with the application program interface API of the platform service using the module 110-2 for data backup management to obtain configuration information associated with at least one of the virtual machine to be backed up, the operating computing device of the virtual machine to be backed up, and the virtual disk to be backed up.

Table 2 is illustratively shown below:

TABLE 2

```
{
    "server": {
        ...
        "OS-EXT-SRV-ATTR:instance_name": "instance-00000028",
        ...
        "id": "cb4f8471-1900-42c9-ac10-e3a2010a27bf",
        ...
        "OS-EXT-SRV-ATTR:hypervisor_hostname":
"cncd-av-vm-235-221.ccoe.lab.emc.com",
        "name": "eng-vip-vm1",
        ...
        "os-extended-volumes:volumes_attached": [
            {
                "id": "e7b8f5da-ba29-4cab-b06b-8b52d7f6c164"
            },
            {
                "id": "bb44457b-3cf8-4e4b-a7ee-45114b7de891"
            }
        ],
        ...
    }
}
```

In the example shown in Table 2, a response about the above configuration information is obtained based on OpenStack nova. The response indicates configuration information of the virtual machine 140-1 to be backed up, the operating computing device 120-1 of the virtual machine to be backed up, and the virtual disks 142 and 144 to be backed up. It is to be understood that this response is only illustrative and the scope of the present disclosure is not limited in this aspect.

For example, in the above illustrative response, the ID of the virtual machine to be backed up (namely, instance) is, for instance, "instance-00000028," and the ID of its operating computing device (namely, hypervisor) is, for instance, "cncd-av-vm-235-221.ccoe.lab.emc.com," the Its of the additional virtual disk of the virtual machine to be backed up is, for instance, "e7b8f5da-ba29-4cab-b06b-8b52d7f6c164" and "bb44457b-3cf8-4e4b-a7ee-45114b7de891." After obtaining the configuration information required by the virtual disk mounted for backing up the virtual machine, the module 110-2, for instance, packs the configuration data of the above virtual machine to be backed up, the operating computing device of the virtual machine to be backed up and the virtual disk to be backed up into a message, and transmits it to the change block tracking proxy 122 via the platform message bus 160. In some embodiments, the configuration data further include data associated with enabling the virtual disk to be backed up with "change block tracking" for the computing device operating the virtual disk to be backed up to determine whether "triggering condition of incremental backup" is met based on whether the virtual disk to be backed is enabled or not.

In some embodiments, method 400 further includes: suspending the virtual machine to be backed up so as to back up the virtual disk. For example, when the backup is triggered, the virtual machine to be backed up is suspended to back up the virtual disk to be backed up.

With the above method 400, by transmitting the obtained configuration data of the virtual machine to be backed up, the operating computing device of the virtual machine to be backed up and the virtual disk to be backed up to the operating computing device, incremental backup is performed to the block device that requires data backup so as to reduce time and system resource consumed by the backup processing and improve data backup efficiency and performance.

Figure 5:
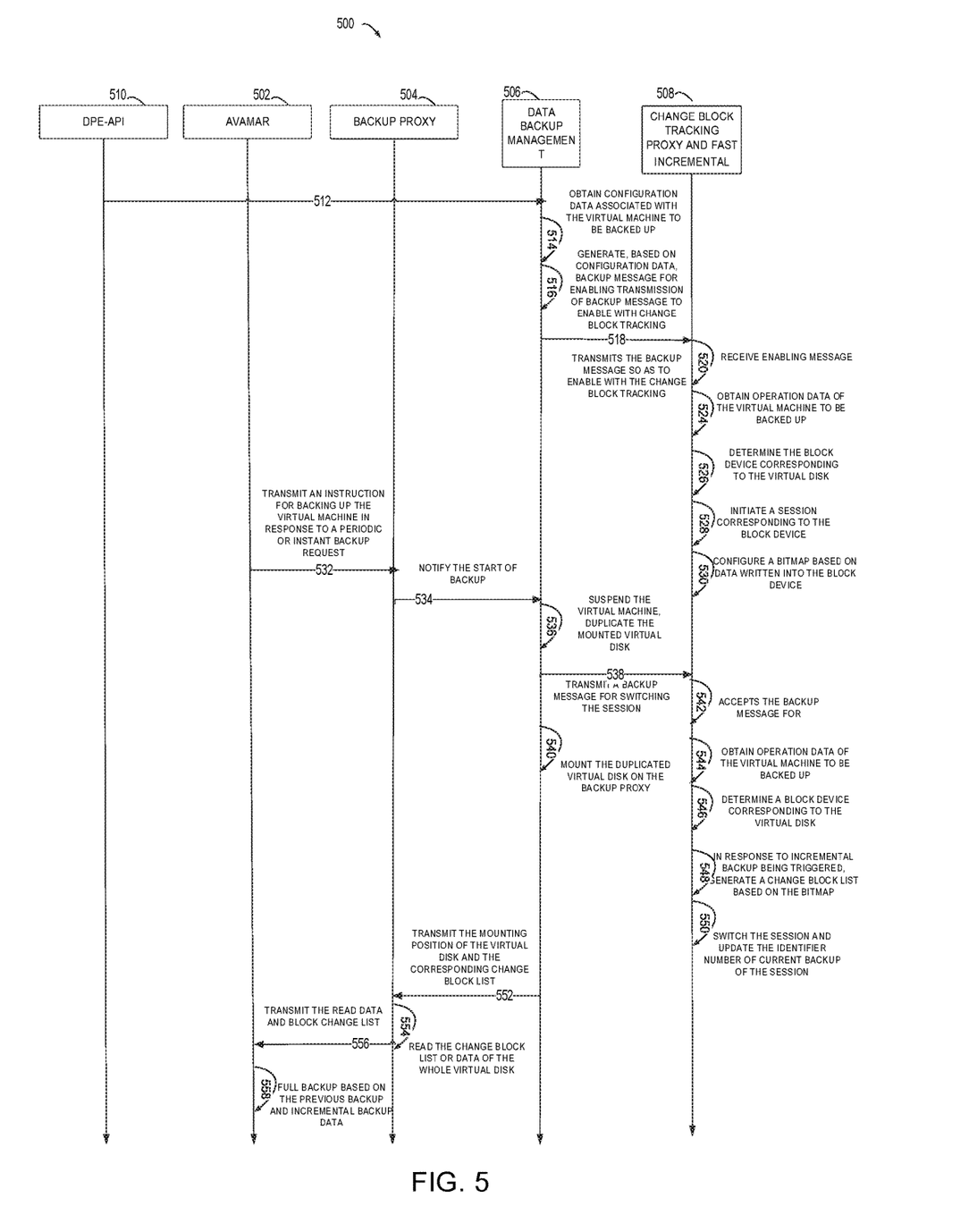
FIG. 5 is an interaction diagram illustrating a data backup method 500 in accordance with some embodiments of the present disclosure.

FIG. 5 is an interactive diagram illustrating a method 500 for data backup in accordance with some embodiments of the present disclosure. In FIG. 5, each act is implemented by, for instance, EMC Avamar system 502, a backup proxy 504, a data backup management 506, a change block tracking and fast incremental module 508, and a DPE API 510. The backup proxy 504, for instance, is a virtual machine deployed on the computing device 120 for performing backup operation to a plurality of virtual machines operated by the computing device 120, and the computing device 120 may also include a plurality of backup proxies 504 so as to be able to back up a greater number of virtual machines, for instance, performing concurrent data backup. The change block tracking and fast incremental module 508, for instance, is deployed on the computing device 120, as illustrated in FIG. 1. It is to be understood that method 500 may further include additional acts not shown andior omit the shown acts, and the scope of the present disclosure is not limited in this aspect.

As shown in FIG. 5, when the virtual machine is registered, if the user enables "change block tracking" to the whole or a part of the virtual disk in the virtual disk to be backed up, then at 512, DPE API 510 will transmit the information to the data backup proxy 506.

After receiving the above information, the data backup management 506, at 514, obtains configuration information associated with the virtual machine to be backed up. The configuration information associated with the virtual machine to be backed up includes, for instance, configuration information of the virtual machine to be backed up, the operating computing device of the virtual machine to be backed up, and the virtual disk to be backed up. Table 2 is an example of the configuration information. At 516, the data backup management 506 generates, based on configuration information, a backup message indicting that data backup is to be performed for enabling change block tracking. At 518, the data backup management 506 transmits the backup message so as to enable with the change block tracking.

At the change block tracking and fast incremental module 508, at 520, the backup message for enabling is received by means of monitoring the platform message bus. At 524, the operation data of the virtual machine to be backed up (for instance, virtual machine 140-1) on the computing device 120 are obtained based on the backup message for enabling. At 526, the block device (such as 146 and 148) corresponding to the virtual disk (such as 142 and 144) of the virtual machine to be backed up 140-1 is determined based on the operation data. At 528, the session corresponding to the block device is started to track writes of the block device. At 530, a bitmap for the session is configured based on the writes on the data volumes. The above may be viewed as a preparation process of data backup.

At 532, the Avamar system 502 transmits an instruction of backing up the virtual machine to the backup proxy 504 in response to a request for instant backup or periodic backup so as to notify the backup proxy which virtual machine to be backed up.

After receiving the above instruction of backing up the virtual machine, the backup proxy 504, at 534, notifies the data backup management 506 of starting to back up the virtual machine.

At 536, the data backup management 506 suspends the virtual machine 140-1 to be backed up and duplicates the virtual disk mounted on the virtual machine. At 538, a backup message is transmitted so as to switch the session. At 540, the duplicated virtual disk is mounted on the backup proxy.

The change block tracking and fast incremental module 508, at 542, accepts the backup message for switching the session. At 544, the operation data of the virtual machine to be backed up (such as virtual machine 140-1) on the computing device 120 are obtained based on the backup message for switching the session. At 546, the block device (such as 146 and 148) corresponding to the virtual disk (for instance, 142 and 144) of the virtual machine to be backed up 140-1 at the moment is determined based on the operation data. At 548, in response to the incremental backup triggering the session-based bitmap, a change block list is generated which indicates data change of the corresponding virtual disk between this backup and the previous backup. At 550, the change block tracking and fast incremental module 508 switches or updates the session and updates the backup identifier number of this backup. The session is switched or updated to prepare for the next backup and tracking of data writes to the corresponding block device continues; the backup identifier number for this backup is updated for the next backup to determine whether incremental backup conditions are met. At 552, the data backup management 508 transmits the mounting position of the virtual disk and the corresponding change block list to the backup proxy 504.

The backup proxy 504 will decide whether incremental backup is performed for each virtual disk. Particularly, at 554, for each virtual disk, if there exists a change block list, the backup proxy 504 will read the data of the corresponding byte based on the offset and length data indicated by the change block list. If there does not exist a change block list, the backup proxy 504 will read the complete data of the mounted virtual disk. At 556, the backup proxy 504 will transmit the read data and the block change list to the Avamar system. The Avamar system 502 virtually synthesizes complete backup data based on the changed data of the previous backup data and this incremental backup for the user to perform complete data restoration.

With the above method 500, when the triggering condition for the incremental backup is met, incremental backup is performed based on the changed data of the block device corresponding to the virtual disk of the virtual machine to be backed up; when the triggering condition for the incremental backup is not met, the complete backup of the virtual disk of the virtual machine to be backed up is performed automatically. On the one hand, backup efficiency is improved with the use of incremental backup; and on the other hand, when it is impossible to perform incremental backup due to come special cases, it is still possible to perform full backup automatically so as to ensure integrity and reliability of backup data. Moreover, complete backup data are synthesized virtually based on changed data of the previous backup data and this incremental backup, thereby improving the efficiency of generating complete backup data for the user to perform restoration of complete backup data.

With the data backup method and data backup management method and device according to embodiments of the present disclosure, the backup performance is improved significantly. As incremental backup is used, unchanged data are not read, thereby saving CPU, memory and disk IO considerably. Particular in the case of low change rate, for instance, with the virtual disk of 100 GB as an example, when the changed data are 5%, tests show that compared with the traditional full backup, the backup performance is improved by as high as 81% with the data backup method and system according to the embodiments of the present disclosure. The specific test result data are further illustrated below with reference to Table 3.

TABLE 3

| Size of virtual disk (GB) | Backup type | IO type | Change rate | Average duration (s) |
|---|---|---|---|---|
| 100 | Full backup | N/A | 5% | 498 |
| 100 | Change block tracking | sequential | 5% | 95 |
| 100 | Change block tracking | random | 5% | 273 |

Besides, independent of particular management programs, the data backup method and system according to embodiments of the present disclosure support different types of management applications, such as QEMU and KVM. In addition, they do not rely on the storage backend, and thus, support different storage backends, such as LVM and DELL EMC VNX, Unity, VMAX, and storage transmission via iSCSI and FC without the additional configuration of a management program or storage.

Figure 6:
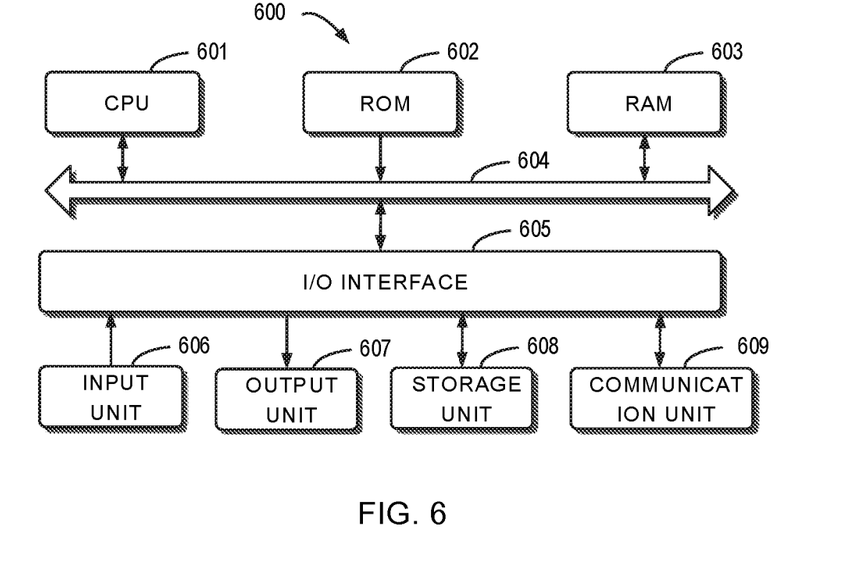
FIG. 6 schematically illustrates a block diagram of an electronic device 600 suitable for implementing embodiments of the present disclosure.

FIG. 6 is a block diagram schematically illustrating an electronic device 600 suitable to implement embodiments of the present disclosure. The device 600 may be used to implement one or more devices of the computer network system 100 shown in FIG. 1. As illustrated in FIG. 6, the device 600 includes a central processing unit (CPU) 601, which may execute various appropriate actions and processing based on the computer program instructions stored in a read-only memory (ROM) 602 or the computer program instructions loaded into a random access memory (RAM) 603 from a storage unit 608, The RAM 603 also stores all kinds of programs and data required by operating the storage device 600. CPU 601, ROM 602 and RAM 603 are connected to each other via a bus 604 to which an input/output (I/O) interface 605 is also connected.

A plurality of components in the device 600 are connected to the I/O interface 605, including: an input unit 606, such as keyboard, mouse and the like; an output unit 607, such as various types of displays, loudspeakers and the like; a storage unit 608, such as the magnetic disk, optical disk and the like; and a communication unit 609, such as network card, modem, wireless communication transceiver and the like. The communication unit 609 allows the device 600 to exchange information/data with other devices through computer networks such as Internet and/or various telecommunication networks.

Each procedure and processing described above, for instance, a method 200 executed for data backup, a method 300 for determining whether the triggering condition for the incremental backup is met, a management method 400 for data backup and a data backup method 500, may be executed by a processing unit 601. For example, in some embodiments, the method 200, 300, 400 and 500 may be implemented as computer software programs, which are stored in a machine-readable medium, such as a storage unit 608. In some embodiments, the computer program may be partially or completely loaded and/or installed to the device 600 via ROM 602 and/or the communication unit 609. When the computer program is loaded to RAM 603 and executed by CPU 601, one or more operations of the above described method 200, 300, 400 and 500 are implemented. Alternatively, in other embodiments, CPU 601 may be configured to implement one or more acts of the method 200, 300, 400 and 500 in any other proper manner (for instance, by means of firmware).

The present disclosure may be a method, an apparatus, a system and/or a computer program product. The computer program product may include a computer-readable storage medium loaded with computer-readable program instructions thereon for executing various aspects of the present disclosure.

The computer-readable storage medium may be a tangible device capable of holding and storing instructions used by the instruction-executing device. The computer-readable storage medium may be, but not limited to, for example, electrical storage devices, magnetic storage devices, optical storage devices, electromagnetic storage devices, semiconductor storage devices or any random appropriate combinations thereof. More specific examples (non-exhaustive list) of the computer-readable storage medium include: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described herein may be downloaded from the computer-readable storage medium to various computing/processing devices, or to external computers or external storage devices via Internet, local area network, wide area network and/or wireless network. The network may include copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure may be assembly instructions, instructions of instruction set architecture (ISA), machine instructions, machine-related instructions, microcodes, firmware instructions, state setting data, or a source code or target code written by any combinations of one or more programming languages including object-oriented programming languages, such as Smalltalk, C and so on, and conventional procedural programming languages, such as "C" language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described in reference with the flow chart and/or block diagram of the method, device (system) and computer program product according to the embodiments of the present disclosure. It is to be understood that each block in the flow chart and/or block diagram and any combinations of various blocks thereof may be implemented by the computer-readable program instructions.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions enable the computer, the programmable data processing device and/or other devices to operate in a particular way, such that the computer-readable medium storing instructions may comprise a manufactured article that includes instructions for implementing various aspects of the functions/actions specified in one or more blocks of the flow chart and/or block diagram.

The computer-readable program instructions may also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices may realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram may represent a module, a program segment, or a portion of the instruction. The module, the program segment or the portion of the instruction includes one or more executable instructions for implementing specified logic functions. In some alternative implementations, the function indicated in the block may also occur in an order different from the one represented in the drawings. For example, two consecutive blocks actually may be executed in parallel, and sometimes they may also be executed in a reverse order depending on the involved functions. It should also be noted that each block in the block diagram and/or flow chart, and any combinations of the blocks thereof may be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

Those described above are only optional embodiments of the present disclosure, not intended to limit the present disclosure. For those skilled in the art, the present disclosure allows for various modifications and variations. Any amendment, equivalent arrangement or improvement that fall within the spirit and principle of the present disclosure shall be contained in the scope of protection of the present disclosure.

We claim:

1. A method of data backup, comprising;
receiving a backup message indicating that data backup is to be performed, the backup message indicating at least one of the following: a virtual machine to be backed up, and an operating computing device of the virtual machine to be backed up;
determining, based on the backup message, a block device for which data backup is to be performed, the block device corresponding to at least a part of virtual disk to be backed up associated with the virtual machine to be backed up or the operating computing device to be backed up; and
performing incremental backup on data in the block device,
wherein performing incremental backup on data in the block device further comprises:
determining whether a triggering condition for the incremental backup is met; and
in response to the triggering condition for the incremental backup being met, performing the incremental backup on data in the block device, and
wherein determining whether the triggering condition for the incremental backup is met comprises determining:

whether a comparison value of a current backup serial number and a previous backup serial number meets a first predetermined condition, the backup serial numbers being used to identify backup of the virtual machine to be backed up; and whether a comparison value of a current backup serial number and a previous backup serial number of a session corresponding to the block device meets a second predetermined condition.

2. The method according to claim 1, wherein determining a block device for which data backup is to be performed comprises:

in response to determining that the operating computing device of the virtual machine to be backed up indicated by the backup message corresponds to the computing device, obtaining operation data of the virtual machine to be backed up; and determining, based on the operation data, a block device corresponding to at least the part of the virtual disk to be backed up.

3. The method according to claim 1, wherein performing incremental backup on the data comprises:

initiating a session corresponding to the block device;

configuring a bitmap of the session based on data written into the block device;

in response to the incremental backup being triggered, determining a change block list corresponding to the block device; and updating a current backup identifier number for the session based on the change block list.

4. A method of managing data backup, comprising:

transmitting a backup message indicting that data backup is to be performed, the backup message indicating at least one of the following: a virtual machine to be backed up, an operating computing device of the virtual machine to be backed up, and a virtual disk to be backed up, wherein the operating computing device performs, based on the backup message, incremental backup for a block device which requires data backup to be performed, wherein performing incremental backup on data in the block device further comprises:

determining whether a triggering condition for the incremental backup is met; and in response to the triggering condition for the incremental backup being met, performing the incremental backup on data in the block device, and wherein determining whether the triggering condition for the incremental backup is met comprises determining:

whether a comparison value of a current backup serial number and a previous backup serial number meets a first predetermined condition, the backup serial numbers being used to identify backup of the virtual machine to be backed up; and whether a comparison value of a current backup serial number and a previous backup serial number of a session corresponding to the block device meets a second predetermined condition.

5. The method according to claim 4, further comprising:

in response to a periodic backup request or an instant backup request, obtaining configuration data associated with at least one of the virtual machine to be backed up, the operating computing device of the virtual machine to be backed up, and the virtual disk to be backed up; and generating the backup message based on the configuration data.

6. The method according to claim 5, where the backup message further indicates data associated with enabling the virtual disk to be backed up with change block tracking.

7. The method according to claim 4, further comprising: suspending the virtual machine to be backed up to back up the virtual disk.

8. A device for backing up data, comprising:

a memory configured to store one or more programs; and a processing unit coupled to the memory and configured to execute the one or more programs to cause the device to perform a method, the method comprises:

receiving a backup message indicating that data backup is to be performed, the backup message indicating at least one of the following: a virtual machine to be backed up, and an operating computing device of the virtual machine to be backed up;

determining, based on the backup message, a block device for which data backup is to be performed, the block device corresponding to at least a part of virtual disk to be backed up associated with the virtual machine to be backed up or the operating computing device to be backed up; and performing incremental backup on data in the block device, wherein performing incremental backup on data in the block device further comprises:

determining whether a triggering condition for the incremental backup is met; and in response to the triggering condition for the incremental backup being met, performing the incremental backup on data in the block device, and wherein determining whether the triggering condition for the incremental backup is met comprises determining:

whether a comparison value of a current backup serial number and a previous backup serial number meets a first predetermined condition, the backup serial numbers being used to identify backup of the virtual machine to be backed up; and whether a comparison value of a current backup serial number and a previous backup serial number of a session corresponding to the block device meets a second predetermined condition.

9. The device according to claim 8, wherein determining a block device for which data backup is to be performed comprises:

in response to determining that the operating computing device of the virtual machine to be backed up indicated by the backup message corresponds to the computing device, obtaining operation data of the virtual machine to be backed up; and determining, based on the operation data, a block device corresponding to at least the part of the virtual disk to be backed up.

10. The device according to claim 8, wherein performing incremental backup on the data comprises:

initiating a session corresponding to the block device;

configuring a bitmap of the session based on data written into the block device;

in response to the incremental backup being triggered, determining a change block list corresponding to the block device; and updating a current backup identifier number for the session based on the change block list.

* * * * *

UNITED STATES PATENT AND TRADEMARK OFFICE
CERTIFICATE OF CORRECTION

PATENT NO. : 10,713,123 B2
APPLICATION NO. : 16/251449
DATED : July 14, 2020
INVENTOR(S) : Jing Yu et al.

Page 1 of 1

It is certified that error appears in the above-identified patent and that said Letters Patent is hereby corrected as shown below:

In the Specification

Column 1, Line 65, the phrase "backup message indicting that" should read -- backup message indicating that --.

Column 12, Line 2, the phrase "backup message indicting that" should read -- backup message indicating that --.

In the Claims

Column 17, Line 33 in Claim 4, the phrase "backup message indicting that" should read -- backup message indicating that --.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*